United States Patent

[11] 3,626,083

[72] Inventors Herbert F. Minter
Pittsburgh;
Richard D. Buckley, Stoneboro; Martin P. Seidel, Sharon, all of Pa.
[21] Appl. No. 724,646
[22] Filed Jan. 12, 1968
[45] Patented Dec. 7, 1971
[73] Assignee Westinghouse Electric Corporation
Pittsburgh, Pa.
Continuation-in-part of application Ser. No. 355,382, Mar. 27, 1964, now abandoned. This application Jan. 12, 1968, Ser. No. 724,646

[54] HIGH-VOLTAGE INSULATION AND INSULATED HIGH-VOLTAGE APPARATUS
9 Claims, 1 Drawing Fig.
[52] U.S. Cl. .................................................... 174/110,
252/63.2, 252/63.5, 260/37 R
[51] Int. Cl. ..................................................... H01b 3/02
[50] Field of Search ........................................... 252/63.2,
63.5; 174/110,.94, DIG. 1; 260/37, 33.6 AO, 33.6 U; 23/143

[56] References Cited
UNITED STATES PATENTS
2,656,250  10/1953  Thibon et al. ................. 23/143
2,768,264  10/1956  Jones et al. ................... 200/151 X
2,933,480  3/1960   Gresham et al. .............. 260/80.5
2,997,526  8/1961   Kessel et al. .................. 260/41.5

OTHER REFERENCES
Insulating Materials for Design and Engineering Practice, J. Wiley & Sons (1962) p. 451– 452

Primary Examiner—John D. Welsh
Attorneys—F. Shapoe and Alex Mich, Jr.

ABSTRACT: An admixture of (1) from 55 to 70 percent by weight of hydrated alumina and (2) from 30 to 45 percent by weight of a petroleum oil extended ethylene-propylene-diene terpolymer, containing from 20 to 100 phr. of oil, is molded about electrical apparatus to provide insulation for components thereof. The hydrated alumina is advantageously finely divided so that a major portion or substantially all particles are less than 2 microns. The terpolymer is derived from the reaction of an admixture of (I) from about 85 to 99 molar percent of a mixture of (a) about 3o to 70 molar percent of ethylene and (b) about 30 to 70 molar percent of propylene and (II) from about 1 to 15 molar percent of a diene having isolated or nonconjugated double bonds, at least one of the double bonds of the diene being terminally located.

PATENTED DEC 7 1971
3,626,083
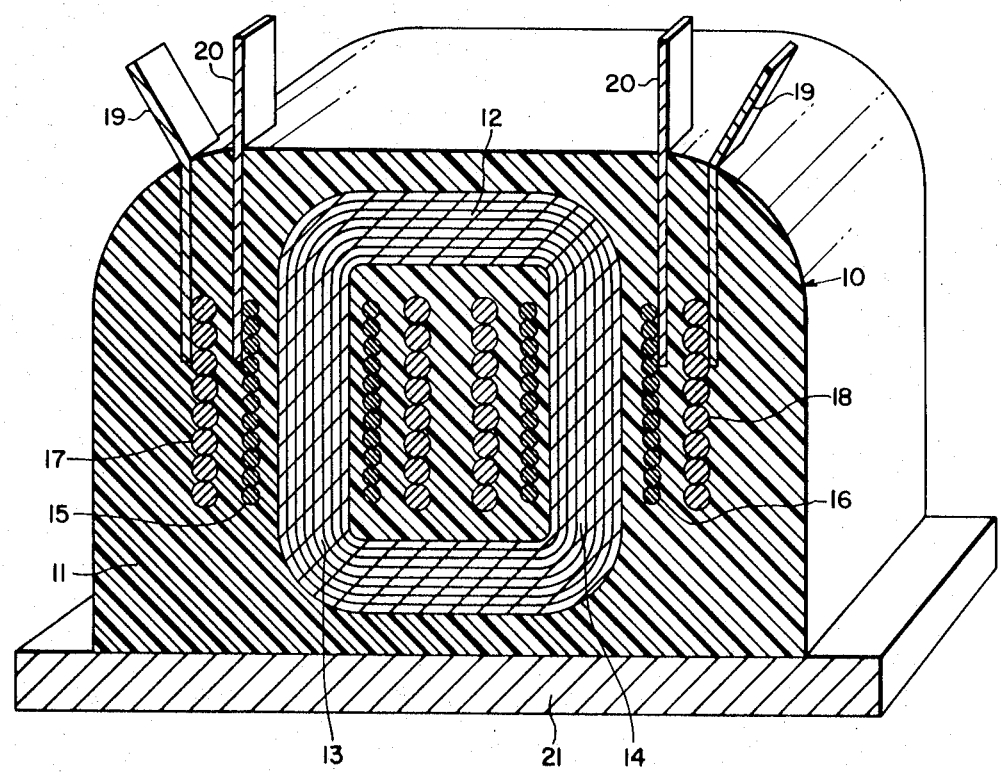
WITNESSES
Theodore T. Wrobel
James T. Young
INVENTORS
Richard D. Buckley, Herbert F. Minter
and Martin P. Seidel
BY Alex Mich Jr.
ATTORNEY

HIGH-VOLTAGE INSULATION AND INSULATED HIGH-VOLTAGE APPARATUS

CROSS REFERENCES TO RELATED APPLICATIONS

This application is a continuation-in-part of application Ser. No. 355,382, now abandoned, filed Mar. 27, 1964.

BACKGROUND OF THE INVENTION

This invention relates, in general, to electrical apparatus having molded organic insulation which will withstand exposure for prolonged periods to high-voltage stresses and contaminating atmospheres. More particularly, this invention relates to minimizing the failure of electrical apparatus due to degradation of organic insulation by long-term exposure to high electrical potentials.

Electrical insulating materials must have properties suitable not only to permit prolonged service in various environments but also to permit fabrication of the electrical equipment by convenient and economical methods. Most organic insulating materials are easily fabricated or shaped by convenient molding methods and techniques but have properties which limit its use in electrical equipment and/or the environments to which it may be exposed. Electrical equipment which has organic insulation disposed between members having a difference in electrical potential is not generally suitable for prolonged use in environments which include high humidity, moisture, salt and dust and high electrical stress. Such insulation must have a high voltage endurance and must be resistant to arcing, tracking and the surface creepage resulting therefrom.

Arcing and tracking on organic insulation will occur when the insulation, under an applied electrical stress, is exposed to conditions such as high humidity, moisture, contaminating particles or combinations thereof. The environmental conditions will lower the resistance of the insulation sufficiently to permit a current leakage or current flow therethrough. With current flowing through the insulation, enough heat can be generated to carbonize the organic insulation and form a low-resistance conducting path which can, in turn, produce equipment failure. Arcs discharging across the surface of the insulation can also produce carbonization, low-resistance conducting paths and also ultimately produce premature electrical equipment failures. These failures are principally surface failures although some surface erosion of the insulation may occur.

Prolonged exposure to high-voltage stresses may cause organic insulation to fail or degrade by a different mechanism. Organic insulation which has been subjected to high-voltage stresses for prolonged periods will erode or sometimes crack. This failure is distinguishable from the heretofore described arcing and tracking failures since it occurs in the insulation matrix itself. It should be understood that in many applications either or both types of failures can occur. Materials which exhibit a subsurface erosion or cracking type of failure when exposed to high voltages, including voltage values above corona starting levels, are said to have low voltage endurance properties.

It is a known practice to incorporate certain inorganic compounds into organic materials to make the materials resistance to the arcing and tracking failures. Hydrated alumina, for example, has been added to butyl rubber, epoxy resins and polyester resins to improve their resistance to arcing and tracking failures. The hydrated alumina to minimize this surface type of failure in butyl rubber, for example, so that the failures occur because of subsurface erosion upon prolonged exposure to high voltages. The art is empirical and there are no reliable guides by which the utility or merit of any particular admixture of materials can be predicted. Other properties of the organic insulation may, for example, be unimproved or even degraded. Since either type of insulation failure can result in a failure of the equipment it is associated with, minimization of both types of failure will permit the fabrication of more reliable equipment. Moreover, the incorporation of large amounts of hydrated alumina into polyester and other resinous insulation and particularly into unvulcanized butyl rubber, creates admixtures that are difficult to mold and shape. With admixtures that have poor moldability, distortion of the electrical apparatus during the molding process, as for example the coil to coil or coil to core spacing in transformers is a problem.

Generally, the use of substantial amounts of oil extenders to reduce the viscosity of elastomeric electrical insulating formulations is not acceptable since the cure properties and the electrical properties, e.g., arc and track resistance and high voltage endurance are adversely affected. The use of substantial amounts of oil extenders is, however, attractive from the standpoint of cost since the oils are less expensive than the elastomeric gum. Use of oil extenders could also permit higher filler concentrations for a given required viscosity, the viscosity being a measure of the flowability and therefore moldability of the admixture. The higher filler concentrations could also improve the flame resistance of the molded insulation but the adverse effects of oil extenders on the reliability of equipment performance and cure of the elastomer are such that the attractive features of oil extension have been heretofore sacrificed.

SUMMARY OF THE INVENTION

Briefly, the present invention provides an easily moldable admixture of an ethylene-propylene terpolymer, a petroleum oil extender and relatively large amounts of finely divided hydrate alumina. This readily moldable insulating material may be disposed between spaced electrically conductive members between which high electrical potentials are developed and which are exposed to contaminating atmospheres. The insulation will have a high voltage endurance under corona conditions, an improved flame resistance and will be resistant to arcing and tracking failures.

It is therefore a primary object of the present invention to provide electrical apparatus having insulation which may be exposed to high voltages and contaminating atmospheres for prolonged periods because of its arc and tracking resistance and its high voltage endurance properties.

Another object of this invention is to provide a novel admixture of an ethylene-propylene-diene elastomer, an extending oil and a finely divided hydrated alumina filler which may be easily molded or shaped and which, in its cured form, may be exposed to high voltages and contaminating environments for prolonged periods without failure.

Further objects and advantages of the invention will become apparent as the following description proceeds and features of novelty which characterize the invention will be pointed out in particularity in the claims annexed to and forming a part of this specification.

BRIEF DESCRIPTION OF THE DRAWING

For a better understanding of the invention, reference may be had to the accompanying drawing, in which:

The single FIGURE is a perspective view, partially sectioned, of a high-voltage transformer representing one embodiment of the invention.

DESCRIPTION OF THE PREFERRED EMBODIMENTS

It has now been discovered that admixtures of an ethylene-propylene-diene elastomer, extending oil and hydrated alumina may be employed as insulation for electrical apparatus, equipment and members, as for example transformers, and exposed to long-term rigorous electrical stresses and environmental conditions without the failures attending the heretofore employed insulations. Referring now to the single FIGURE of the drawing, we have illustrated a transformer 10 encased in the molded insulation 11, in accordance with the present invention. A core member 12 is composed of laminations of a suitable magnetic steel, as for example silicon steel. Spaced around the side legs 13 and 14 of the core member 12, are the secondary windings 15 and 16 of the transformer. The secondary windings are spaced from the legs of the core member and that space is filled with the insulation 11 of this invention.

The primary windings 17 and 18 of the transformer are spaced around the secondary windings. Leads 19 and 20 extend from the insulation mass 11 and constitute, respectively, the primary and secondary terminals for the transformer. It is apparent that the insulation 11 of this invention encases the entire structure of the transformer, fills the spaces between the secondary and primary coils and the space between the secondary coils and the legs of the core member to form a void-free mass. It should also be apparent that viscous, difficult to mold admixtures will affect component spacing that can affect the design characteristics and performance of the transformer. If desired, the entire unit can be supported on a base member 21.

In view of the presence of spaced conductors that are subjected to different electrical potentials, arcing may occur and the insulation may be subject to degradation by tracking and creepage especially on external surfaces exposed to contaminating atmospheres. Because of the high electrical potentials within the described structure and between the described terminals, the insulation is also subject to degradation from continued voltage stress. In the operation of such structures, especially if undesirable voids are present in the insulation, the insulation will be subjected to degradation by high-voltage stresses frequently giving rise to corona conditions.

To provide prolonged service under typical but adverse conditions, the improved insulation 11, in accordance with this invention, is an admixture of an ethylene-propylene-diene elastomer, an extending oil and finely divided hydrated alumina. It should be understood that the term ethylene-propylene-diene elastomer describes certain specific synthetic elastomers or gums produced by the interpolymerization of alkenes, having a terminal double bond, as for example ethylene and propylene, with a diene having isolated double bonds, one of the double bonds being terminally located. Catalysts, generally known as coordination catalysts, are used in preparing the interpolymers. The terpolymer gums or elastomers are derived from the reaction of an admixture comprising (1) from about 85 to 99 molar percent of a mixture of about (a) 30 to 70 molar percent of ethylene and (b) about 30 to 70 percent of propylene and (2) from about 1 to 15 molar percent of a diene having the isolated or nonconjugated double bonds, at least one of the double bonds of the diene being terminally located.

Other mono-olefins having terminal unsaturation may be included in the mixture of ethylene and propylene in minor quantities without deleterious effects. Indeed, minor quantities of other mono-olefins are normally present as impurities in ethylene-propylene mixtures.

The diene may be any aliphatic compound, straight, open chain, or cyclic, or mixtures of two or more, so long as the double bonds are isolated and at least one is terminally located. The requirement that the double bonds be isolated or nonconjugated establishes the minimum number of carbon atoms at five. The upper limit may be as high as 20 carbon atoms, although it is preferable to employ dienes having the minimum number of carbons or thereabout, to produce a relatively short side chain linking the ethylene-propylene units of the polymer. Suitable dienes are, for example, bicyclopentadiene, cyclooctadiene, 1,4-pentadiene, 1,4-hexadiene, 1,7-octadiene, 1,19-eicosadiene and the like.

Methods for preparing these gums or elastomers are known to those skilled in the art and reference may be had, for example, to U.S. PAT. No. 2,933,480 for specific details and these details are incorporated herein by reference. Examples of commercially available ethylene-propylene terpolymer gums, under proprietary names, include EPT 3509 from the Enjay Chemical Company, NORDEL from E. I. duPont de Nemours & Co. and ROYALENE 200 from Naugatuck Chemical Company.

An essential component in the insulating composition of this invention is, of course, hydrated alumina. For the attainment of the necessary degree of arc and track resistance, voltage endurance under corona conditions and flame resistance, from about 55 to 70 percent of hydrated alumina, on a total weight basis should be employed. A distinct advantage of the insulation of this invention is the possibility and ease of including the hydrated alumina in larger proportions, than may be included with other elastomeric materials where the use of extending oils is severely limited or prohibited.

Although some improvement may be contemplated from any particulated or finely divided hydrated alumina in the specified range of composition, a pronounced increase in the arc and track resistance occurs when finely divided hydrated alumina having a major portion of the particles less than 2 microns in size is employed. The ultimate resistance to arcing and tracking will, for example, be attained if all of the hydrated alumina particles are less than 2 microns in size as determined by electron microscope. Using particles that are substantially larger than about 10 microns in the admixture will result in a lower degree of arc and track resistance. That may not pass the 8.1-watt energy level tests described hereinbelow.

The extender oils are employed in amounts ranging from 20 to 100 phr. of elastomeric terpolymer to produce easily molded stock without an undesirable degradation of the arc and track resistance or the improved voltage endurance, corona resistance and other properties attending this invention. Indeed, the inclusion of the extender oil permits relatively higher loadings of hydrated alumina which provide an increase in flame resistance. It should be again emphasized that the foregoing substantial amounts of oil cannot be employed with the butyl gum or other elastomeric materials that might be employed as electrical insulation. To our knowledge, none of the heretofore-employed elastomers could be compounded with the substantial amounts of hydrated alumina and oil to provide satisfactory insulating compositions. It is only the described elastomeric terpolymer that will provide a combination suitable for electrical apparatus such as transformers.

The described elastomeric terpolymer is compatible with most hydrocarbon or petroleum oils, especially saturated oils of low polarity such as paraffinic and naphthenic types, and as noted heretofore they may be added in amounts from 10 phr. to as high as the amount of terpolymer gum itself, on a weight basis. Examples of suitable proprietary petroleum oils include Necton 60, Circosol 2XH, Flexon 765, Shellflex 790 and Sun Oil 5150. Petroleum or hydrocarbon oils having a viscosity of 100 to 5,000 Saybolt Universal seconds at 100° F. may be employed as extender oils in the insulating admixtures of this invention. A suitable paraffinic oil, employed in the examples hereinbelow, contained 78.3 percent paraffinic carbons, 20.8 percent aromatic carbons and 0.9 percent polar compounds. The viscosity of the oil was 490 Saybolt Universal seconds at 100° F.

Another particularly suitable extending oil contains 4 percent aromatic carbons, 23 percent naphthenic carbons and 73 percent paraffinic carbons. The preferred range of petroleum oil extender is from 50 to 65 phr.

In addition to the essential hydrated alumina, small amounts of other fillers may be employed in combination with the elastomeric terpolymer. Small quantities of carbon black, in the order of about 1 to 5 phr., may be employed as a colorant and to absorb ultraviolet energy and limit the degrading effects of light to a thin surface layer. Other fillers, to improve other properties may be included, in accordance with principles known in the art, if desired. For example, about 10 percent by weight of finely divided clay, calcium silicate, talc or silica may be included as a filler to improve the molding characteristics and ultimate physical properties of the vulcanized admixtures.

Metal oxides such as magnesium oxide or zinc oxide, in amounts ranging from about 3 to 20 phr., may be employed to produce improvements in physical and electrical stability.

Small amounts of plasticizer in amounts up to about 15 phr., may be added to further improve the moldability of the stock. Examples of suitable plasticizers include fatty acids, metal salts and esters of fatty acids, vegetable oils and petroleum waxes, for instance, calcium stearate.

Vulcanizable silicones and certain dioximes such as p-quinonedioxime and dibenzoyl-p-quiononedioxime may be added to improve the power factor and water resistance.

Curing systems for compositions or formulations that include the ethylene-propylene terpolymer gum are preferably the conventional sulfur systems known in the art. A low-sulfur vulcanizing system is recommended for maximum insulating values. Peroxide and phenolic resin systems may also be employed.

The insulating compositions of this invention may be described as admixtures of (A) hydrated alumina and other inorganic fillers and (B) a petroleum oil extended ethylene-propylene-diene elastomer containing from 20 to 100 phr. of petroleum oil. The (B) petroleum oil extended elastomer is intended to cover formulations of ethylene-propylene-diene elastomer, described heretofore, together with the specified amount of extending oil plasticizers, vulcanizing agents, accelerators and other elastomer compounding additives those skilled in the art would ordinarily include in compounded rubber mixtures. In accordance with these principles, these insulating compositions may be described as admixtures, on a total weight basis, of (A) from about 55 to 70 percent of particulated hydrated alumina and (B) from about 30 to 45 percent of a petroleum oil extended ethylene-propylene-diene elastomer containing from 20 to 100 phr. of petroleum oil.

The invention will be further described in the following examples of a molded transformer. The details are illustrative of the invention and should not be considered limiting.

One hundred parts, by weight, of an ethylene-propylene-diene gum derived from an admixture of about 60 molar percent of ethylene, 39 molar percent of propylene and 1 molar percent of bicyclopentadiene is added to a Banbury mixer together with 1 phr. (parts per hundred) of dibenzoyl-p-quinonedioxime and mixed until a temperature of about 340° to 380° F. is reached. The mixed material is discharged and cooled. The cooled material together with 341 phr. of hydrated alumina, 3 phr. of carbon black, 5 phr. of zinc oxide, 2 phr. of stearic acid, 56 phr. of the heretofore-described paraffinic petroleum oil, 5 phr. zinc stearate, 4 phr. of petroleum wax and 4 phr. of a vulcanizable silicone is mixed until a temperature of about 220° to 300° F. is reached in order to drive off moisture in the fillers. The mix is discharged and cooled. Together with 1 phr. of sulfur, 1 phr. of zinc dimethyldithiocarbamate, 1 phr. of tetramethylthiuram disulfide, 1 phr. of tellurium diethylodithiocarbamate and 1 phr. of benzothiazyl disulfide the cooled mix is recharged, mixed to a temperature of about 180° F. and dumped. This unvulcanized stock is then employed in molding transformers in accordance with this invention. It should be noted that the pretreatment of the gum with dibenzoyl-p-quinonedioxime considerably reduces total mixing time.

A mold cavity heated to a temperature of about 300°–320° F. is sprayed with a release agent. A portion of the unvulcanized stock is injected into the mold, where it remains for about 30 minutes and is fully cured. Compared to the heretofore employed butyl rubber formulations, the formulations of this invention require less molding force and thus produce less distortion of transformer assemblies. If the admixture is degassed no internal or surface flaws will be apparent. Pore-free cross sections may be attained in one-third less mold cure times as compared to butyl rubber formulations. The low viscosity of the compounds of this invention at room temperature has permitted molding of units without the dielectric preheating of stock, a common practice in the processing of the butyl stock heretofore employed.

Additional examples of admixtures which are suitable in accordance with this invention are presented in convenient form in table I. The amounts of materials are expressed in parts per hundred of gum or elastomer (phr.).

Table I

| Material | A | B | C | D | E |
| --- | --- | --- | --- | --- | --- |
| Ethylene-propylene-diene gum | 100 | 100 | 100 | 100 | 100 |
| Dibenzoyl-p-quinonedioxime | 1.0 | 1.0 | 1.0 | 1.0 | 1.0 |
| Hydrated alumina | 235 | 223 | 313 | 341 | 182 |
| Petroleum oil | 56 | 20 | 40 | 56 | 20 |
| Carbon black | 3.0 | 3.0 | 3.0 | 3.0 | 3.0 |
| Stearic acid | 2.0 | 2.0 | 2.0 | 2.0 | 2.0 |
| Zinc stearate | 5.0 | 5.0 | 5.0 | 5.0 | 5.0 |
| Vulcanizable silicone | 4.0 | 4.0 | 4.0 | 4.0 | 4.0 |
| Petroleum wax | 4.0 | 4.0 | 4.0 | 4.0 | 4.0 |
| Zinc oxide | 5.0 | 5.0 | 5.0 | 5.0 | 5.0 |
| Sulfur | 1.0 | 1.0 | 1.0 | 1.0 | 1.0 |
| Zinc dimethyldithiocarbamate | ( ) (3.0) | ( ) (3.0) | 1.0 | 1.0 | ( ) (3.0) |
| Mercaptobenzothiazole | ( ) | ( ) | — | — | ( ) |
| Zinc benzothiazyl sulfide | 1.0 | 1.0 | — | — | 1.0 |
| Tetramethylthiuram disulfide | — | — | 1.0 | 1.0 | — |
| Tellurium diethyldithiocarbamate | — | — | 1.0 | 1.0 | — |
| Benzothiazyl disulfide | — | — | 1.0 | 1.0 | — |

Each of these formulations were molded and produced satisfactory members.

As noted hereinabove, organic insulation employed in electrical apparatus exemplified by the transformed illustrated in FIG. 1, is subject to arcing and tracking and failure from exposure to high-voltage stress under corona conditions and in the presence of ozone. To evaluate the arc and track resistance of the insulation of this invention, samples of an admixture of ethylene-propylene terpolymer rubber and hydrated alumina in varying proportions, were subjected to a test described by Mandelcorn and Dakin in an article entitled "Wet Surface Tracking of Insulation; A Differential Test With Controlled Short Discharges to a Water Electrode", AIEE Transactions, Part III (Power Apparatus and Systems), Volume 81, 1962, page 291.

One inch square samples are subjected to a metal-to-liquid electric discharge continuously for 1 minute. The liquid is a 1 percent, by weight, ammonium chloride solution in water and contains 0.1 percent of a wetting agent (Aerosol OT). Immediately after discharge, in this case at a power level of 8.1 watts, the surface is tested successively at 500 and 1,000 volts and must not reveal a conducting path at these levels. Data in this test have been correlated by Mandelcorn and Dakin with those of the conventional Dust and Fog Test (ASTM Method D-2132-62T), and samples passing the 8.1-watt test correspond to a period greater than 500 hours in the ASTM test.

Sample stock for the foregoing test were prepared in accordance with the heretofore-described formulations. All samples employing hydrated alumina where essentially all of the particles were less than 2 microns passed the high-level 8.1-watt test. Less consistent results were obtained with hydrated alumina having larger particle sizes.

At page 1033 of the AIEE Transactions on Power Apparatus and Systems, No. 69, Dec. 9, 1963, Hewitt and Dakin, in an article entitled "Voltage Endurance Tests of Insulating Materials" describe an accelerated procedure for testing the voltage endurance of insulating materials at high frequencies. Employing the equipment and procedures described therein, the voltage endurance of void-free samples of alumina-filled butyl rubber and alumina-filled ethylene-propylene-diene terpolymer was compared at various concentrations of hydrated alumina.

Sample stocks were prepared by methods similar to that employed in the preparation of the sample stock for the arc and track resistance tests. Void-free samples, 5×5×0.070 inches were molded employing both butyl rubber and ethylene-porpylene-diene terpolymer rubber, each with varying amounts of hydrated alumina from about 50 to 60 percent by weight. The samples were machined to a thickness of about 60 mils in the test area, placed between a cylindrical self-aligning stainless steel upper electrode about one-half inch in diameter and a cylindrical stainless steel lower electrode having a minimum diameter of 1 ½ inches. A force of 0.25 to 0.4 pounds was applied to the upper electrode. The samples were subjected to various constant voltages, from about 150 to 240 volts rms per mil at 1,500 cycles per second.

Samples formulated with the ethylene-propylene-diene terpolymer containing 20 and 56 phr. of a paraffinic oil had an equivalent 60 cycle life far exceeding those formulated from butyl rubber stock containing 4 phr. of oil. For example, ethylene-propylene-diene terpolymer samples containing about 55 percent, by weight, of hydrated alumina and tested at 163 volts RMS/mil. had an equivalent 60-cycle life of about 83,500 hours whereas butyl rubber samples containing about 58 percent of hydrated alumina, by weight, had an equivalent 60-cycle life of only 17,500 hours. It should be noted that all of the test voltages were high enough to exceed the corona threshold voltage. Whether the test chamber was maintained in dry condition or at a relative humidity of 50 percent, whether the electrode edges were round or flat, a distinct surprise improved endurance to high voltage by the ethylene-propylene terpolymer samples was apparent at all voltages and filler concentrations.

While there have been shown and described what are at present considered to be the preferred embodiments of the invention, modifications thereto will readily occur to those skilled in the art. For example, the ethylene-propylene terpolymer gum can be blended or covulcanized with minor proportions of other elastomeric gums which are cross-linked by the particular type of cure system being employed to vulcanize the ethylene-propylene terpolymer rubber, although the same high degree of voltage endurance may not be attained. It is not desired, therefore, that the invention be limited to the specific arrangements shown and described and it is intended to cover in the appended claims all such modifications as fall within the true spirit and scope of the invention.

We claim:

1. In electrical apparatus having spaced electrically conductive members between which an electric potential is developed, a cured organic base insulating material having improved voltage endurance properties disposed between said members, the insulating material consisting essentially of a vulcanized mixture of (A) from about 55 to 70 percent, by weight, of particulated hydrated alumina and (B) from about 30 to 45 percent, by weight, of a petroleum oil extended ethylene-propylene-diene terpolymer consisting essentially of (1) from about 85 to 99 molar percent of a mixture of (a) about 30 to 70 molar percent of ethylene and (b) about 30 to 70 percent of propylene and (2) from about 1 to 15 molar percent of a diene having isolated double bonds, at least one of the double bonds being terminally located, and containing from 20 to 100 phr. of the petroleum oil.

2. The apparatus of claim 1 wherein a major portion of said hydrated alumina has a particle size less than 2 microns.

3. The apparatus of claim 1 wherein the particulated hydrated alumina has substantially all of its particles of a particle size less than 2 microns and (B) the petroleum oil content is from 50 to 65 phr. of ethylene-propylene-diene terpolymer.

4. The apparatus of claim 1 wherein said spaced electrically conductive members are elements of a transformer and the insulating material is molded to support and largely surround the electrically conductive members.

5. A cured organic base electrical insulating composition suitable for prolonged exposure to arcing, tracking and high-voltage stresses under corona conditions consisting essentially of an intimate admixture of (A) from about 55 to 70 percent of a particulated hydrated alumina and (B) from about 30 to 45 percent, by weight, of a petroleum oil extended ethylene-propylene terpolymer consisting essentially of (1) from about 85 to 99 molar percent of a mixture of (a) about 30 to 70 molar percent of ethylene and (b) about 30 to 70 percent of propylene and (2) from about 1 to 15 molar percent of a diene having isolated double bonds, at least one of the double bonds being terminally located, and containing from 20 to 100 phr. of the petroleum oil.

6. The composition of claim 5 wherein a major portion of the hydrated alumina has a particle size less than 2 microns.

7. The composition of claim 5 wherein the particle size of substantially all of the hydrated alumina is less than 2 microns.

8. The composition of claim 5 wherein the petroleum oil is within the range of 50 to 65 phr.

9. In electrical apparatus having spaced electrically conductive members between which an electrical potential is developed, a cured organic base-insulating material having improved voltage endurance properties disposed between said members, the improvement comprising the insulating material consisting essentially of a vulcanized mixture of (A) from about 55 to 70 percent, by weight, of particulated hydrated alumina and (B) from about 30 to 45 percent, by weight, of a petroleum oil extended ethylene-propylene-diene terpolymer consisting essentially of (1) from about 85 to 99 molar percent of a mixture of (a) about 30 to 70 molar percent of ethylene and (b) about 30 to 70 percent of propylene and (2) from about 1 to 15 molar percent of a diene having isolated double bonds, at least one of the double bonds being terminally located, and containing from 20 to 100 phr. of the petroleum oil.

* * * * *